US010467244B2

United States Patent
Krishnan et al.

(10) Patent No.: US 10,467,244 B2
(45) Date of Patent: Nov. 5, 2019

(54) AUTOMATIC GENERATION OF STRUCTURED DATA FROM SEMI-STRUCTURED DATA

(71) Applicant: Unifi Software, San Mateo, CA (US)

(72) Inventors: Ravikiran Krishnan, San Mateo, CA (US); Ayush Parashar, Foster City, CA (US); Sudeep Sarkar, Tampa, FL (US)

(73) Assignee: UNIFI SOFTWARE, INC., San Mateo, CA (US)

( * ) Notice: Subject to any disclaimer, the term of this patent is extended or adjusted under 35 U.S.C. 154(b) by 271 days.

(21) Appl. No.: 15/583,966

(22) Filed: May 1, 2017

(65) Prior Publication Data

US 2017/0316070 A1  Nov. 2, 2017

Related U.S. Application Data

(60) Provisional application No. 62/329,982, filed on Apr. 29, 2016.

(51) Int. Cl.

| | |
|---|---|
| *G06F 7/02* | (2006.01) |
| *G06F 16/00* | (2019.01) |
| *G06F 16/25* | (2019.01) |
| *G06F 16/21* | (2019.01) |
| *G06F 16/22* | (2019.01) |
| *G06F 16/84* | (2019.01) |

(52) U.S. Cl.
CPC .......... *G06F 16/258* (2019.01); *G06F 16/211* (2019.01); *G06F 16/22* (2019.01); *G06F 16/86* (2019.01)

(58) Field of Classification Search
CPC .......... G06F 16/84; G06F 16/86; G06F 16/22; G06F 16/2228; G06F 16/285; G06F 16/211; G06F 16/258
See application file for complete search history.

(56) References Cited

U.S. PATENT DOCUMENTS

| | | | |
|---|---|---|---|
| 7,853,081 B2 | 12/2010 | Thint | |
| 8,616,443 B2 | 12/2013 | Butt et al. | |
| 8,831,070 B2 | 12/2014 | Huang et al. | |
| 2008/0189314 A1* | 8/2008 | Reddy | G06F 16/258 |
| 2009/0150313 A1 | 6/2009 | Heilper et al. | |
| 2009/0300054 A1 | 12/2009 | Fisher et al. | |
| 2013/0204884 A1* | 8/2013 | Stewart | G06F 16/13 |
| | | | 707/755 |
| 2014/0279834 A1* | 9/2014 | Tsirogiannis | G06F 16/211 |
| | | | 707/602 |
| 2015/0095391 A1 | 4/2015 | Gajjar et al. | |

* cited by examiner

*Primary Examiner* — Bruce M Moser
(74) *Attorney, Agent, or Firm* — Kanika Radhakrishnan; Evergreen Valley Law Group

(57) ABSTRACT

A method and system for generating structured data from semi-structured data are provided. The method includes reading a plurality of records from a data file including semi-structured data. Further, the method includes obtaining aligned delimiters in a list for every record that has been read. The method also includes selecting a most occurring delimiter from the list. The method then includes constructing a regular expression using the selected delimiter to split the records into different fields. The method also includes reconstructing the records for the regular expression to fit and split into fields. In addition, the method includes displaying the records split into the fields.

21 Claims, 3 Drawing Sheets

AUTOMATIC GENERATION OF STRUCTURED DATA FROM SEMI-STRUCTURED DATA

TECHNICAL FIELD

Embodiments of the disclosure relate generally to data parsing. Embodiments relate more particularly to a method and system for generating structured data from semi-structured data.

BACKGROUND

Today, a lot of work is executed on data in a simple fashion to generate value out of it. However, huge amount of data is semi-structured or un-structured making it very difficult for a user to work. Semi-structured data is a form of structured data that does not conform to the formal structure of data models associated with relational database or other forms of data tables. Such data needs to be cleaned up before making it available to users.

To overcome the problem of semi-structured data, a manual cleanup (parsing) process exists that cleans up (also known as wrangling) semi-structured data through a tool (user interface driven tools). However, the manual cleanup of the semi-structured data takes time and ultimately delays the insight that data might provide to a user like business analyst. Additionally, for data that is extensive in nature, the manual cleanup can be a very labor intensive task and consumes lots of manual time. Other than manual and time consuming drawbacks, the parsing is also prone to user error as it is a long and laborious process.

In view of the above, there is a need for an efficient method for generating structured data from semi-structured data.

SUMMARY

Various embodiments of the present disclosure provide systems and methods for generating structured data from semi-structured data.

The method includes reading a plurality of records from a data file including semi-structured data. Further, the method includes obtaining aligned delimiters in a list for every record that has been read. The method also includes selecting a most occurring delimiter from the list. The method then includes constructing a regular expression using the selected delimiter to split the records into different fields. The method also includes reconstructing the records for the regular expression to fit and split into fields. In addition, the method includes displaying the records split into the fields.

A system includes a processor. The system also includes a memory coupled to the processor. The memory stores instructions which when executed by the processor cause the system to perform a method for generating structured data from semi-structured data. The method includes reading a plurality of records from a data file including semi-structured data. Further, the method includes obtaining aligned delimiters in a list for every record that has been read. The method also includes selecting a most occurring delimiter from the list. The method then includes constructing a regular expression using the selected delimiter to split the records into different fields. The method also includes reconstructing the records for the regular expression to fit and split into fields. In addition, the method includes displaying the records split into the fields. As the delimiters are in order of occurrence, we can also split the records into fields, by looking at the occurrence if the delimiter in the record.

The method includes reading a plurality of records from a data file including semi-structured data. Further, the method includes obtaining aligned delimiters in a list for every record that has been read. The method also includes selecting a most occurring delimiter from the list. The method then includes constructing a regular expression using the selected delimiter to split the records into different fields. The method further includes identifying missing delimiters and missing values. The method also includes reconstructing the records for the regular expression to fit and split into fields, and subsequently filling in NULL for the missing values. As the delimiters are in order of occurrence, we can also split the records into fields, by looking at the occurrence if the delimiter in the record.

In addition, the method includes displaying the records in a split tabulated form.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
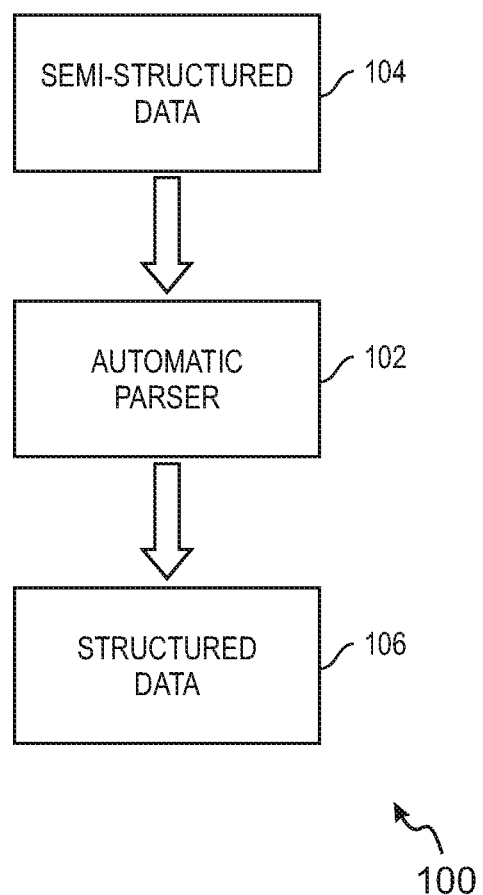
FIG. 1 is a block diagram of the environment, according to the embodiments as disclosed herein.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

A method for automatically generating structured data from semi-structured data is provided. The semi-structured data can be received by a server as a result of various activities. For example, in email campaign an email including advertisement or link to the advertisement is sent to a user. The user may then access the advertisement from within the email. The data collected as result of the user interacting with the email can be semi-structured. The server processes the semi-structured data to generate the structured data.

It is to be appreciated that the email campaign is included as an example and the generation of structured data is applicable to any form of semi-structured data.

The semi-structured data (file or data file) includes a plurality of lines or sequences or records. In illustrated example, line 1 and line 2 are as follows.

Line 1
180.76.5.154 - - [24/Sep/2012 00:16:02-0700] "GET www.exampledomain.ws/phoenix/forums/feed.php?f=22 HTTP/1.1" 200 7035 "-" "Mozilla/5.0 (compatible; Baiduspider/2.0; +http://www.baidu.com/search/spider.html)"

Line 2
67.188.145.142 - -[24/Sep/2012 00:16:42-0700] "GET www.exampledomain.ws/images/335i/IMG_003.JPG HTTP/1.1" 200 56545 "http://sfbay.craigslistorg/pen/cto/3270627997.html" "Mozilla/5.0 (Windows NT 6.0) AppleWebKit/537.1 (KHTML, like Gecko) Chrome/21.0.1180.89 Safari/537.1"

The lines are then aligned using dynamic time warping technique. The dynamic time warping technique aligns the lines based on distances between every character in one line with every character in another line. The alignment results in generating two lines of equal length. The distances to align matching non-Alpha characters are determined using following:

a. If Non-Alpha and Alpha are being compared—High Cost (
  i. Distance between character '/' and 'Q' is 10000000
b. If Alpha and Alpha are being compared—High Cost
  i. Distance between character 'P' and 'Q' is 10000000
c. If two similar Non-Alpha and Non-Alpha are being compared—zero cost (possible delimiters)
  i. Distance between character ':' and ':' is 0
d. If non similar Non-Alpha and Non-Alpha are being compared—low cost
  i. Distance between character ':' and '/' is 1000

$$D(n, m) = c(i_n, j_m) + \min \begin{cases} D(n-1, m-1), \\ D(n-1, m), \\ D(n, m-1) \end{cases}$$

Min here dictates how the alignment path would look like. Out of the aligned sequence, only matched non-alpha numeric characters is obtained, as shown below for illustrated example.

180.766.555.154 - - [24/Sep/2012 00:16:02-0700] "GET www.exampledomain.ws/phoenix/forums/fed.php?f=22 HTTP/1.1"                200                70355 "--------------------------------------------------------" "Mozilla/5.0 (compatible; Baiduspideeeeeeeer/2.0; +http://www.baidu.com/search/spider.html))))))))))))))"
677.188.145.142 - - [24/Sep/2012 00:16:42-0700] "GET www.exampledomain.ws/imagess/335iiiiiii/IMG_003.JPGGGG HTTP/1.1" 200 56545 "http://sfbay.craigslistorg/pen/cto/3270627997.html" "Mozilla/5.0 (Windows NT 6.0) AppleWebKit/537.1 (KHTML, like Gecko) Chrome/21.0.1180.89 Safari/537.1"

The aligned lines are then processed to match non-alpha numeric characters. In illustrated example, the matched non-alpha numeric characters are as follows.

.... - - [// :: -] "./. /." " " "/.(."

The processing includes picking one of the alignments (initial alignment, A1).
180.76.5.154 - - [24/Sep/2012 00:16:02-0700] "GET www.exampledomain.ws/phoenix/forums/feed.php?f=22 HTTP/1.1" 200 7035 "-" "Mozilla/5.0 (compatible; Baiduspider/2.0; +http://www.baidu.com/search/spider.html)"

An aligned delimiter sequence is then obtained using matched non-alpha characters. Initial possible delimiters D1 is as follows.

.... - - [// :: -]"././." " " "/.(."

The following steps are then performed iteratively.
a. Pick the next sequence (test)
b. Sequence: Align (A, test)
   Previous alignment (A)
   Obtain common delimiters (D)
c. Delimiter: Align (D, D1) using DTW
   Initial delimiter alignment (D1)
   Obtain possible delimiters (D2)
   Add D2 to Delimiter Set (S)
d. Repeat the above steps
   Till N number of test sequences
e. Possible Delimiters:
   Find Common set from S
   Find Length of each delimiter sequence
   Mode of all length of each delimiter sequence in S Examples of two different types of test sequences (rows) are as follows.
Clean row—
123.123.123.123 - - [26/Apr/2000:00:23:48-0400] "GET/pics/wpaper.gif HTTP/1.0" 200 6248 http://www.jafsoft.com/asctortf/"Mozilla/4.05 (Macintosh; I; PPC)"
Bad row—
133.43.96.45 - - 200 1204
D—.... - - [// :: -] "././." " " "/.(."
D1 (Initial alignment)—.... - - [// :: -] "./. /." " " "/.(."
D2 (alignment sequence of delimiter)—.... - - [// :: -] "./. /." " " "/.(."

D2 forms one of the items in the list S (sample delimiter set) shown below.

.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." ".." "/.(.;."
.... - - [// :: -] "./. /." " " "/.(."

Each iteration explained above provides for one sequence of delimiters. Mode is computed on the list S. Mode is based on the length of each sequence of delimiters. The mode includes Rank 1 (highest frequency element) of the frequency distribution of a list resulting in the sequence of delimiters shown in S. Mode (length of each element in S) gives following possible delimiter set in order.

.... - - [// :: -] "./. /." " " "/.(."

Once the delimiter set is identified then it is used for parsing any new input line to generate structured data from it. As the delimiters are in order of occurrence, we can also split the records into fields, by looking at the occurrence of the delimiters in the record. This includes creating a regex (regular expression) and parsing the line using the regex to generate the output, i.e. the structured data. The parsing includes following:

a. Possible Delimiters in order
      .... - - [// :: -] "./. /." " " "/.(."
   b. Symmetric Delimiters
      ", [ ], ( )
      Set priority
   c. Given test data to be parsed
      Process data using
         Known patterns
           Ex: (\d{1,3}\.\d{1,3}\.\d{1,3}\.\d{1,3})->IP address
         In the order of occurrence of possible delimiters
           Separate attributes values In the parsing process, the test row includes
180.76.5.154 - - [24/Sep/2012 00:16:02-0700] "GET www.exampledomain.ws/phoenix/forums/feed.php?f=22 HTTP/1.1" 200 7035 "-"
"Mozilla/5.0 (compatible; Baiduspider/2.0; +http://www.baidu.com/search/spider.html)"
.... - - [// :: -] "./. /." " " "/. (." As there are 3 pairs of" and one pair of [ ], applying symmetric delimiters gives the following grouping—
"GET www.exampledomain.ws/phoenix/forums/feed.php?f=22 HTTP/1.1" "-" "Mozilla/5.0 (compatible; Baiduspider/2.0; +http://www.baidu.com/search/spider.html)" [24/Sep/2012 00:16:02-0700]

If there are identifiable data type pattern such as in this case is the IP address then additional group is 180.76.5.154.

The groups stay together when the splitting process is done. Given all the groups the given test row is split; the groups are kept and split using other delimiters in the above sequence of delimiters. This results in following:
<180.76.5.154>
<24/Sep/2012 00:16:02-0700>
<GET www.exampledomain.ws/phoenix/forums/feed.php?f=22 HTTP/1.1>
<200><7035>
<-><Mozilla/5.0 (compatible; Baiduspider/2.0; http://www.baidu.com/search/spider.html>

Other examples of input and corresponding output includes following:
Input
180.76.5.154 - - [24/Sep/2012 00:16:02-0700] "GET www.exampledomain.ws/phoenix/forums/feed.php?f=22 HTTP/1.1" 200 7035 "-" "Mozilla/5 0.0 (compatible; Baiduspider/2.0; +http://www.baidu.com/search/spider.html)"
Output
<180.76.5.154>
<24/Sep/2012 00:16:02-0700>
<GET www.exampledomain.ws/phoenix/forums/feed.php?f=22 HTTP/1.1>
<200>
<7035>
<->
<Mozilla/5.0 (compatible; Baiduspider/2.0; +http://www.baidu.com/search/spider.html>

Input
67.188.145.142 - - [24/Sep/2012 00:16:42-0700] "GET www.exampledomain.ws/images/335i/IMG_003. JPG HTTP/1.1" 200 56545 "http://sfbay.craigslistorg/pen/cto/3270627997.html" "Mozilla/5.0 (Windows NT 6.0) AppleWebKit/537.1 (KHTML, like Gecko) Chrome/21.0.1180.89 Safari/537.1"
Output
<67.188.145.142>
<24/Sep/2012 00:16:42-0700>
<GET www.exampledomain.ws/images/335i/IMG_003. JPG HTTP/1.1>
<200>
<56545>
<http://sfbay.craigslist.org/pen/cto/3270627997.html>
<Mozilla/5.0 (Windows NT 6.0) AppleWebKit/537.1 (KHTML, like Gecko) Chrome/21.0.1180.89 Safari/537.1>

The output or structured data so generated includes attributes or fields. For example, <67.188.145.142> is the attribute or the field. Similarly, examples of different attributes or fields include—<24/Sep/2012 00:16:42-0700>; <GET www.exampledomain.ws/images/335i/IMG_003. JPG HTTP/1.1>; <200>; and so on. These attributes can then be used for various purposes. For example, automatic IP address attribute generation helps in identifying the IP address corresponding to the user etc.

In various embodiments, end of line delimiter is new line character and column delimiter has following characteristics:
   column delimiter cannot be alpha numeric
   column delimiter can be multi-byte or multi-character
   there can be different column delimiter for every column
   there can be any number of column delimiters in every row Various embodiments provide a completely automated method of generating structured data from the semi-structured data. Each column in excel file (output) represents an attribute and helps in further processing of the attribute for various purposes. The automatic parsing enables parsing of the semi-structured (alphanumeric, delimiter—multi-byte or multi-character, delimiter can be different for different columns with multiple delimiters) and partially structured data, and in identification of missing data. The data is parsed by building a model using cost biased model dynamic time warping and multiple alignment sequences. The records used for building model are either from the original semi-structured data or a small subset that represents the original data. Missing delimiters identification is done on a record that does not satisfy (bad record or row) the delimiters found by the server. The identification is done by aligning the found delimiters with a bad record or row. This gives an idea of what data is missing. The content context is not being identified/compared with a huge set of patterns in a database of content.

FIG. 1 is a block diagram of an environment 100, according to the embodiments as disclosed herein. The environment 100 includes an automatic parser 102 that converts semi-structured data 104 to structured data 106.

Typically, a parser is a compiler or interpreter that breaks data into smaller elements for easy translation into another language. The parser analyzes a string of symbols conforming to the rules of a formal language. Here, the parser is automatic and handles various complexities. The complexities include, but are not limited to, different delimiters for different columns, multiple character delimiters separating each of the data fields and missing data. The automatic parser 102 has the ability to handle semi-structure data of any format including missing rows and badly written rows. In some embodiments, the present invention also provides the ability to have semi-automatic parsing, where the user can also give inputs. Consequently, the time consumed to wrangle or clean the data is reduced to almost zero.

Further, automatic parser 102 looks at the pattern of occurrence of common set of delimiters across multiple rows and come to a consensus. The result is a set of delimiters (combination of different types) on which data can be made tabular. The automatic parser 102 identifies both missing columns and missing delimiters. The identification of the missing delimiters is actually used to reconstruct a bad data into a structured data format that can be represented in a tabular format.

The automatic parser 102 is configured with a non-transitory computer-readable medium, the contents of which causes to perform the method disclosed herein.

The semi-structured data 104 is data that does not conform to the formal structure of data models associated with relational databases. Examples of semi-structured data 104 is as follows:

Example 1

Mar. 29 2004 09:54:26: % PIX-4-106023: Deny icmp src outside:Some-Cisco dst inside:10.0.0.187 (type 3, code 1) by access-group "outside_access_in".

Example 2

62.75.181.210 - - [24/Sep/2012 01:26:31-0700] "GET www.phoenixgreymane.com/forums/
smartfeed_url.php?all_forums=on&elt_14_20=on&elt_
15_20=on&firstpostonly=NO&post_limit=
1_DAY&count_limit=fxy&min_word_size=
http&sort_by=standard_desc&max_word_size=
http&feed_type=RSS2.0&style=HTML
&url=http%3A%2F%2Fdmstncybqsmi.com%2F HTTP/
1.1" 200 30326 "-" "Mozilla/4.0 (compatible; MSIE 6.0; Windows NT 5.1; SV1)"

Structured data 106 includes data that resides in a fixed field within a record or a file. The structured data 106 refers to information with a high degree of organization.

It should be appreciated by those of ordinary skill in the art that FIG. 1 depicts the automatic parser 102 in an oversimplified manner, and a practical embodiment may include additional components and suitably configured processing logic to support known or conventional operating features that are not described in detail herein.

Operational Flow Chart

Figure 2:
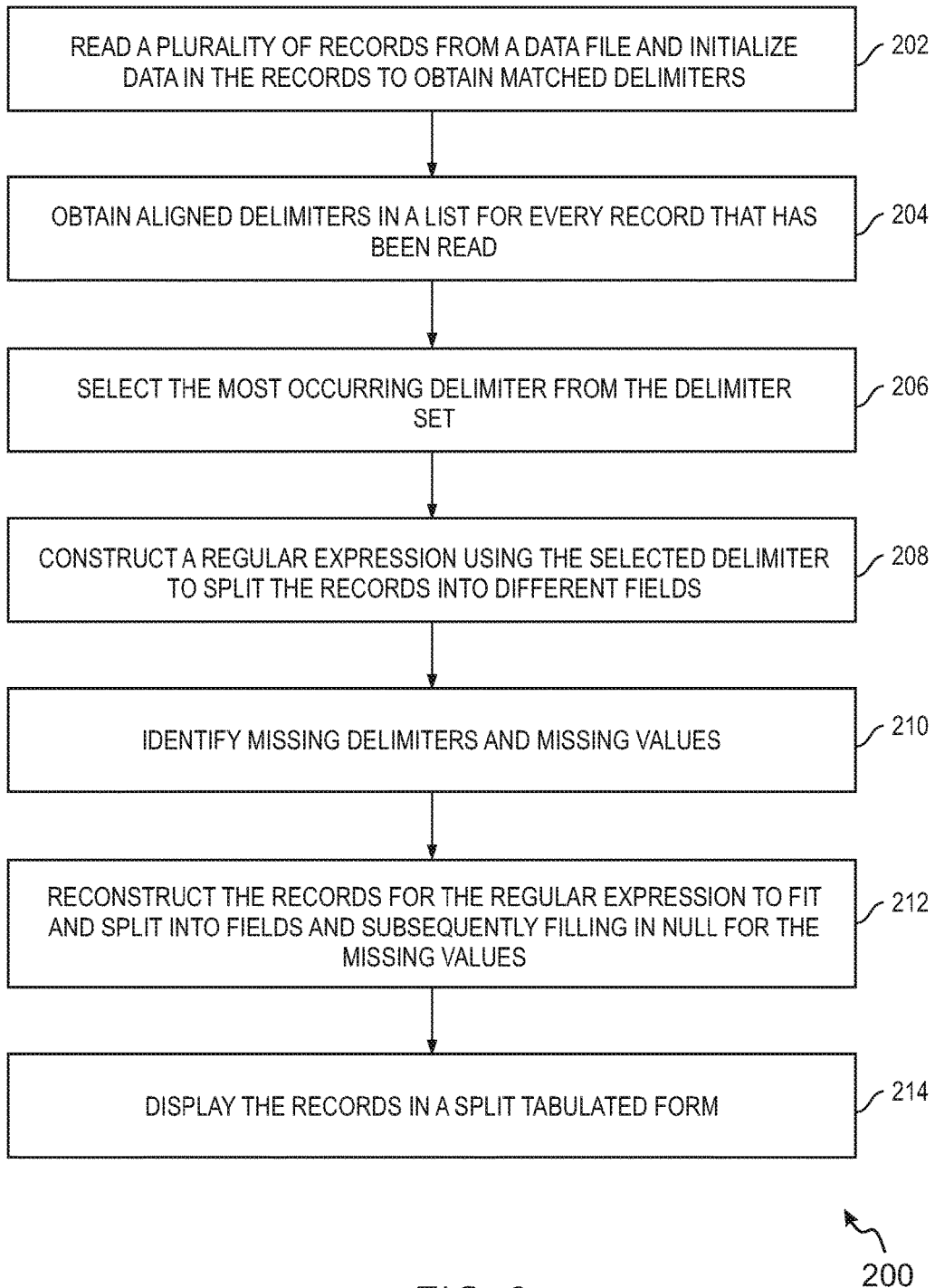
FIG. 2 is a flow chart describing a computer-implemented method for automatically parsing semi-structured data into structured data, according to the embodiments as disclosed herein.

FIG. 2 is a flow chart describing a computer-implemented method for automatically parsing semi-structured data into structured data, according to the embodiments as disclosed herein. The method begins at step 202. The entire method described herein is automated and requires no manual intervention.

At step 202, a plurality of records is read from a data file that ends with an end line delimiter. Subsequently, data is initialized in the records to obtain matched delimiters. For a given set of textual lines in a file, each line is considered as a data line or record. Automatically, the record is then split into different fields (date, URL).

The data file is composed of semi-structured data. The semi-structured data is defined with the following:
 a. End of line delimiter is a new line character.
 b. Column delimiter cannot be alpha numeric
 c. column delimiter can be multi-byte or multi-character
 d. there can be different column delimiter for every column
 e. there can be any number of column delimiters in every row Further, the data is initialized (D_initial) with two randomly selected records to obtain delimiters and subsequently aligned using the DTW process at step 204. Initialization is performed by using Center Star. The Center Star is a technique where an initialized instance (an anchor) is being compared against the incoming data. For example, if "R" is initialized instance and "R1, R2" incoming data, then comparison would be "Align (R1-R2) compare with R".

At step 204, aligned delimiters are obtained in a list for every record that has been read.

For every record that is read, the previous read record is aligned with the current record (D_current). Subsequently, the aligned delimiters (D_matched) are obtained by aligning D-current with D-initial. The aligned delimiters are collected in a list (Delimiter Set). The alignment is done for all lines in the record.

The alignment is performed by Dynamic Time Warping (DTW) that aligns two rows based on non-alphanumeric characters. Two sequences (set of character/numbers/features, not necessarily equal in length) are aligned in order (left/right). The alignment results in interpolation of one or both sequences (making the sequences equal in length).

DTW is a dynamic programming approach obtains minimized error alignment in order. The objective of DTW is to compare two sequences of length "N" and "M" respectively. The sequences are characters in a string. Prior to aligning the sequences, a local distance measure is needed between every set of characters of one sequence to every character in the other sequence. The distances are biased to force alphanumeric characters match to have higher distances. Non-alphanumeric characters are also matched (D_matched) to have zero as its distance measure. A distance matrix (C) is created between the two sets of characters. The distance measure is given to a recurrence relation as follows:

Where, D is the accumulator matrix that collects the minimized error at every i, j in the above equation.

Further, alignment between multiple rows is performed by center star method.

Alignment of two sequences—The distances between the one character to every other character is biased to match the non-alpha numeric characters. DTW is used to align the data and distances are manipulated to bias the system to pick up only matching non-alpha numeric characters. Further, DTW is used for alignment to maintain order so that missing delimiters may be identified later.

Basically, the alignment gives the non-alphanumeric characters that were matched. However, there can be different values for each field for multiple records (samples). In order to handle the different values, multiple sequence alignment process is used. This process (method) is a modified version of the center star method.

The semi-structured data (file or data file) includes a plurality of lines or sequences or records. In illustrated example, line 1 and line 2 are as follows.

Line 1
180.76.5.154 - - [24/Sep/2012 00:16:02-0700] "GET www.exampledomain.ws/phoenix/forums/feed.php?f=22 HTTP/1.1" 200 7035 "-" "Mozilla/5.0 (compatible; Baiduspider/2.0; +http://www.baidu.com/search/spider.html)"

Line 2
67.188.145.142 - - [24/Sep/2012 00:16:42-0700] "GET www.exampledomain.ws/images/335i/IMG_003. JPG HTTP/1.1" 200 56545 "http://sfbay.craigslistorg/pen/cto/3270627997.html" "Mozilla/5.0 (Windows NT 6.0) AppleWebKit/537.1 (KHTML, like Gecko) Chrome/21.0.1180.89 Safari/537.1"

The lines are then aligned using dynamic time warping technique. The dynamic time warping technique aligns the lines based on distances between every character in one line with every character in another line. The alignment results in generating two lines of equal length. The distances to align matching non-Alpha characters are determined using following:

a. If Non-Alpha and Alpha are being compared—High Cost (
  i. Distance between character '/' and 'Q' is 10000000
b. If Alpha and Alpha are being compared—High Cost
  i. Distance between character 'P' and 'Q' is 10000000
c. If two similar Non-Alpha and Non-Alpha are being compared—zero cost (possible delimiters)
  i. Distance between character ':' and ':' is 0
d. If non similar Non-Alpha and Non-Alpha are being compared—low cost
  i. Distance between character ':' and '/' is 1000

$$D(n, m) = c(i_n, j_m) + \min\begin{cases} D(n-1, m-1), \\ D(n-1, m), \\ D(n, m-1) \end{cases}$$

Min here dictates how the alignment path would look like. Out of the aligned sequence, only matched non-alpha numeric characters is obtained, as shown below for illustrated example.

180.766.555.154 - - [24/Sep/2012 00:16:02-0700] "GET www.exampledomain.ws/phoenix/forums/feed.php?f=22 HTTP/1.1" 200 70355 "----------------------------------------------------------"
"Mozilla/5.0 (compatible; Baiduspideeeeeeeer/2.0; +http://www.baidu.com/search/spider.html))))))))))))))"
677.188.145.142 - - [24/Sep/2012 00:16:42-0700] "GET www.exampledomain.ws/imagess/335iiiiiii/IMG_003. JPGGGG HTTP/1.1" 200 56545 "http://sfbay.craigslistorg/pen/cto/3270627997.html" "Mozilla/5.0 (Windows NT 6.0) AppleWebKit/537.1 (KHTML, like Gecko) Chrome/21.0.1180.89 Safari/537.1"

The aligned lines are then processed to match non-alpha numeric characters. In illustrated example, the matched non-alpha numeric characters are as follows.
.... - - [// :: -] "./. /." " " "/.(."

The processing includes picking one of the alignments (initial alignment, A1).
180.76.5.154 - - [24/Sep/2012 00:16:02-0700] "GET www.exampledomain.ws/phoenix/forums/feed.php?f=22 HTTP/1.1" 200 7035 "-" "Mozilla/5.0 (compatible; Baiduspider/2.0; +http://www.baidu.com/search/spider.html)"

An aligned delimiter sequence is then obtained using matched non-alpha characters. Initial possible delimiters D1 is as follows.
.... - - [// :: -] "./. /." " " "/.(."

The following steps are then performed iteratively.
Pick the next sequence (test)
Sequence: Align (A, test)
  Previous alignment (A)
  Obtain common delimiters (D)
Delimiter: Align (D, D1) using DTW
  Initial delimiter alignment (D1)
  Obtain possible delimiters (D2)
  Add D2 to Delimiter Set (S)
Repeat the above steps
  Till N number of test sequences Possible Delimiters:
  Find Common set from S
  Find Length of each delimiter sequence
  Mode of all length of each delimiter sequence in S Examples of two different types of test sequences (rows) are as follows.
Clean row—
123.123.123.123 - - [26/Apr/2000:00:23:48-0400] "GET/pics/wpaper.gif HTTP/1.0" 200 6248 http://www.jafsoft.com/asctortf/ "Mozilla/4.05 (Macintosh; I; PPC)"
Bad row—
133.43.96.45 - - 200 1204
D—.... - - [// :: -] "./. /." " " "/. (."
D1 (Initial alignment)—.... - - [// :: -] "./. /." " " "/.(."
D2 (alignment sequence of delimiter)—.... - - [// :: -] "./. /." " " "/. (."

D2 forms one of the items in the list S (sample delimiter set) shown below.
.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." " " "/.(."
.... - - [// :: -] "./. /." "-" "/.(.."
.... - - [// :: -] "./. /." "-" "/.(.."
.... - - [// :: -] "./. /." "-" "/.(.;."
.... - - [// :: -] "./. /." " " "/.(."

At step 206, the most occurring delimiter is selected from the delimiter set. Alphanumeric characters are removed and non-alphanumeric characters are aligned. The most occurring delimiter (D_matched) in the Delimiter set is chosen (D_chosen).

Each iteration explained above provides for one sequence of delimiters. Mode is computed on the list S. Mode is based on the length of each sequence of delimiters. The mode includes Rank 1 (highest frequency element) of the frequency distribution of a list resulting in the sequence of delimiters shown in S. Mode (length of each element in S) gives following possible delimiter set in order.
.... - - [// :: -] "./. /." " " "/.(."

At step 208, a regular expression is constructed using the selected delimiter (D_chosen) to split the records into different fields. The regular expression is constructed from the multiple alignments of non-alphanumeric characters.

For a given set of delimiters (for example, . . . , --, [,::, //,], ","), a regular expression is constructed and is used to split each record into different fields.

At step 210, missing delimiters and missing values are identified. If the regular expression does not fit then align the selected delimiter with the record. Missing delimiters are identified only on a record that does not satisfy the delimiters found by the system. Further, the identification is performed by aligning the found delimiters with a bad record. As a result, an idea of what data is missing can be found.

As the actual set of delimiters in a specific record is known, the delimiters are aligned with bad rows (missing values/missing delimiters). As a result of the alignment, missing delimiters are found.

Content context is not being identified/compared with a huge set of patterns in a database of content. All non-delimiter characters are considered as content. Further, the type or pattern of the content found gives the content context. For example, 02/02/2222 has pattern of mm/dd/yyyy.

At step 212, records are reconstructed for the regular expression to fit and split into fields and subsequently the missing values are filled with NULL values. The regular expression is run on the records to split the records into various fields. The splitting includes applying symmetric delimiters.

The parsing or reconstruction includes following:
Possible Delimiters in order
.... - - [// :: -] "./. /." " " "/.(."
Symmetric Delimiters
", [ ], ( )
Set priority
Given test data to be parsed
Process data using
Known patterns
Ex: (\d{1,3}\.\d{1,3}\.\d{1,3}\.\d{1,3})->IP address
In the order of occurrence of possible delimiters
Separate attributes values
In the parsing process, the test row includes
180.76.5.154 - - [24/Sep/2012 00:16:02-0700] "GET www.exampledomain.ws/phoenix/forums/feed.php?f=22 HTTP/1.1" 200 7035 "-" "Mozilla/5.0 (compatible; Baiduspider/2.0; +http://www.baidu.com/search/spider.html)"
.... - - [// :: -] "./. /." " " "/. (." As there are 3 pairs of " " and one pair of [ ], applying symmetric delimiters gives the following grouping—
"GET www.exampledomain.ws/phoenix/forums/feed.php?f=22 HTTP/1.1" "-"
"Mozilla/5.0 (compatible; Baiduspider/2.0; +http://www.baidu.com/search/spider.html)" [24/Sep/2012 00:16:02-0700]

If there are identifiable data type pattern such as in this case is the IP address then additional group is 180.76.5.154.

The groups stay together when the splitting process is done. Given all the groups the given test row is split; the groups are kept and split using other delimiters in the above sequence of delimiters. This results in following:
<180.76.5.154>
<24/Sep/2012 00:16:02-0700>
<GET www.exampledomain.ws/phoenix/forums/feed.php?f=22 HTTP/1.1>
<200><7035>
<-><Mozilla/5.0 (compatible; Baiduspider/2.0; http://www.baidu.com/search/spider.html>

At step 214, the records are displayed in a split tabulated form thereby representing the semi-structured data as structured data.

The method ends at step 214.

The present invention is beneficial as it reduces the time spent to structure the data.

System Block Diagram

Figure 3:
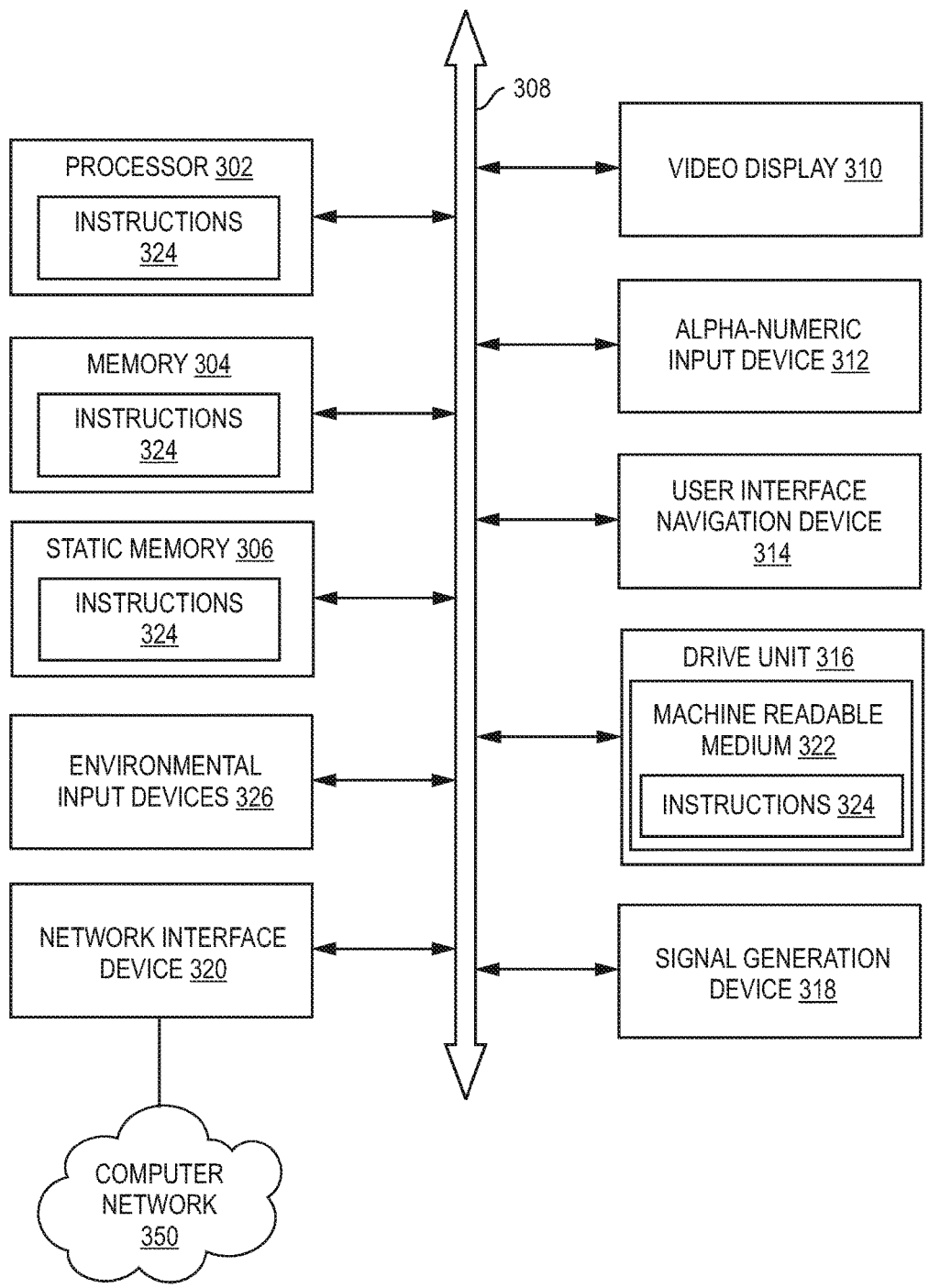
FIG. 3 is a block diagram of a machine in the example form of a computer system within which instructions for causing the machine to perform any one or more of the methodologies discussed herein may be executed.

FIG. 3 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 (a server that performs method described herein) includes a processor 302 (e.g., a central processing unit (CPU), a graphics processing unit (GPU), or both), a main memory 304, and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker), and a network interface device 320. The computer system 300 may also include an environmental input device 326 that may provide a number of inputs describing the environment in which the computer system 300 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 316 includes a machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions 324 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 324 may further be transmitted or received over a computer network 350 using a transmission medium. The instructions 324 may be transmitted using the network interface device 320 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, Python, Scala and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

What is claimed is:

1. A method for generating structured data from semi-structured data, the method comprising:
   reading a plurality of records from a data file comprising semi-structured data;
   obtaining aligned delimiters in a list for every record that has been read;
   selecting a most occurring delimiter from the list;
   constructing a regular expression using the selected delimiter to split the records into different fields;
   reconstructing the records for the regular expression to fit and split into the different fields; and
   displaying the records split into the different fields.

2. The method as claimed in claim 1, wherein the obtaining comprises:
   aligning read records using dynamic time warping.

3. The method as claimed in claim 2, wherein the obtaining further comprises:
   identifying matching non-alpha characters as initial delimiters list D1.

4. The method as claimed in claim 3, wherein the obtaining further comprises iteratively performing:
   picking a test record (test);
   aligning the test record with aligned record (A);
   obtaining common delimiters list D;
   aligning the common delimiters list D with initial delimiters list D1 using dynamic time warping;
   obtaining aligned records delimiters list D2;
   adding D2 to a delimiter set S; and
   repeating above steps till N number of test records are processed.

5. The method as claimed in claim 1, wherein the semi-structured data comprises at least one of:
   end of line delimiter as a new line character;
   column delimiter as alpha numeric;

column delimiter as multi-byte or multi-character;
different column delimiter for every column; and
any number of column delimiters in every row.

6. The method as claimed in claim 1 and further comprising:
identifying missing delimiters and missing values.

7. The method as claimed in claim 6, wherein the reconstructing comprises:
reconstructing the records for the regular expression to fit and subsequently filling in NULL for the missing values.

8. A method for generating structured data from semi-structured data, the method comprising:
reading a plurality of records from a data file comprising semi-structured data;
obtaining aligned delimiters in a list for every record that has been read;
selecting a most occurring delimiter from the list;
constructing a regular expression using the selected delimiter to split the records into different fields;
identifying missing delimiters and missing values;
reconstructing the records for the regular expression to fit and split into the different fields, and subsequently filling in NULL for the missing values; and
displaying the records in a split tabulated form.

9. The method as claimed in claim 8, wherein the obtaining comprises:
aligning read records using dynamic time warping.

10. The method as claimed in claim 9, wherein the obtaining further comprises:
identifying matching non-alpha characters as initial delimiters list D1.

11. The method as claimed in claim 10, wherein the obtaining further comprises iteratively performing:
picking a test record (test);
aligning the test record with aligned record (A);
obtaining common delimiters list D;
aligning the common delimiters list D with initial delimiters list D1 using dynamic time warping;
obtaining aligned records delimiters list D2;
adding D2 to a delimiter set S; and
repeating above steps till N number of test records are processed.

12. The method as claimed in claim 8, wherein the semi-structured data comprises at least one of:
end of line delimiter as a new line character;
column delimiter as alphanumeric;
column delimiter as multi-byte or multi-character;
different column delimiter for every column; and
any number of column delimiters in every row.

13. A system comprising:
a processor; and
a memory coupled to the processor, the memory storing instructions which when executed by the processor cause the system to perform a method for providing information to at user, the method comprising
reading a plurality of records from a data file comprising semi-structured data;
obtaining aligned delimiters in a list for every record that has been read;
selecting a most occurring delimiter from the list;
constructing a regular expression using the selected delimiter to split the records into different fields;
reconstructing the records for the regular expression to fit and split into the different fields; and
displaying the records split into the different fields.

14. The system as claimed in claim 13, wherein the obtaining comprises:
aligning read records using dynamic time warping.

15. The system as claimed in claim 14, wherein the obtaining further comprises:
identifying matching non-alpha characters as initial delimiters list D1.

16. The system as claimed in claim 15, wherein the obtaining further comprises iteratively performing:
picking a test record (test);
aligning the test record with aligned record (A);
obtaining common delimiters list D;
aligning the common delimiters list D with initial delimiters list D1 using dynamic time warping;
obtaining aligned records delimiters list D2;
adding D2 to a delimiter set S; and
repeating above steps till N number of test records are processed.

17. The system as claimed in claim 13, wherein the semi-structured data comprises at least one of:
end of line delimiter as a new line character;
column delimiter as alpha numeric;
column delimiter as multi-byte or multi-character;
different column delimiter for every column; and
any number of column delimiters in every row.

18. The system as claimed in claim 13 and further comprising:
identifying missing delimiters and missing values.

19. The system as claimed in claim 18, wherein the reconstructing comprises:
reconstructing the records for the regular expression to fit and subsequently filling in NULL for the missing values.

20. The system as claimed in claim 13, wherein the reconstructing comprises: applying symmetric delimiters to split the records into the different fields.

21. A method for generating structured data from semi-structured data, the method comprising:
reading a plurality of records from a data file comprising semi-structured data;
aligning read records using dynamic time warping;
obtaining aligned delimiters in a list for every record that has been read;
selecting a most occurring delimiter from the list;
constructing a regular expression using the selected delimiter to split the records into different fields;
reconstructing the records for the regular expression to fit and split into the different fields; and
displaying the records split into the different fields.

* * * * *